United States Patent
Gao et al.

(10) Patent No.: US 10,001,668 B2
(45) Date of Patent: Jun. 19, 2018

(54) LIQUID CRYSTAL PANEL, DISPLAY APPARATUS AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Gao, Beijing (CN); Xue Dong, Beijing (CN); Xiaochuan Chen, Beijing (CN); Qian Wang, Beijing (CN); Wenqing Zhao, Beijing (CN); Haisheng Wang, Beijing (CN); Pengcheng Lu, Beijing (CN); Ming Yang, Beijing (CN); Xiaochen Niu, Beijing (CN); Lei Wang, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/522,277

(22) PCT Filed: Jun. 20, 2016

(86) PCT No.: PCT/CN2016/086390
§ 371 (c)(1),
(2) Date: Apr. 26, 2017

(87) PCT Pub. No.: WO2017/148048
PCT Pub. Date: Sep. 8, 2017

(65) Prior Publication Data
US 2018/0107058 A1    Apr. 19, 2018

(30) Foreign Application Priority Data

Mar. 4, 2016    (CN) .......................... 2016 1 0125155

(51) Int. Cl.
*G02F 1/1335*    (2006.01)
*G02F 1/1343*    (2006.01)
(Continued)

(52) U.S. Cl.
CPC .. *G02F 1/133528* (2013.01); *G02F 1/134309* (2013.01); *G09G 3/3607* (2013.01);
(Continued)

(58) Field of Classification Search
None
See application file for complete search history.

(56) References Cited

U.S. PATENT DOCUMENTS 6,356,322 B1    12/2002    Shimura
2014/0104518 A1    4/2014    Saitou et al.

FOREIGN PATENT DOCUMENTS

CN    101968595 A    2/2011
CN    102043302 A    5/2011
(Continued)

OTHER PUBLICATIONS

International Search Report and Written Opinion (including English translation of Box V) dated Nov. 30, 2016, for corresponding PCT Application No. PCT/CN2016/086390.
(Continued)

*Primary Examiner* — Robin Mishler
(74) *Attorney, Agent, or Firm* — Kinney & Lange, P.A.

(57) ABSTRACT

The present disclosure provides a liquid crystal panel, a display apparatus and a display method, which relate to the display field, and may reduce the number of polarizers, increase transmissivity of the display device and enhance the
(Continued)

optical efficiency of the display device. The liquid crystal panel includes: an upper substrate; a lower substrate; a liquid crystal layer sandwiched between the upper substrate and the lower substrate; a polarizer arranged on a side of the lower substrate facing away from the liquid crystal layer; a common electrode arranged on the upper substrate; and a plurality of pixel electrodes which are arranged on the lower substrate in a region corresponding to each of the sub-pixels and are configured to be driven independently.

2 Claims, 4 Drawing Sheets

(51) Int. Cl.
G09G 3/36 (2006.01)
G02F 1/1337 (2006.01)
(52) U.S. Cl.
CPC ........ *G02F 1/1337* (2013.01); *G02F 1/13439* (2013.01); *G02F 2001/134345* (2013.01); *G02F 2203/30* (2013.01); *G09G 2300/0452* (2013.01); *G09G 2300/0478* (2013.01); *G09G 2310/0243* (2013.01); *G09G 2320/0626* (2013.01)

(56) References Cited

FOREIGN PATENT DOCUMENTS

| CN | 102162964 A | 8/2011 |
| CN | 102944962 A | 2/2013 |
| CN | 203480184 U | 3/2014 |
| CN | 203909438 | 10/2014 |
| CN | 203909438 U | 10/2014 |
| CN | 104483798 A | 4/2015 |
| CN | 105511180 | 4/2016 |
| KR | 20080002242 A | 1/2008 |
| KR | 20090079290 A | 7/2009 |

OTHER PUBLICATIONS

English translation of International Search Report and Written Opinion dated Nov. 30, 2016, for corresponding PCT Application No. PCT/CN2016/086390.

First Chinese Office Action dated Feb. 24, 2018, for corresponding Chinese Application No. 201610125155.7.

LIQUID CRYSTAL PANEL, DISPLAY APPARATUS AND DISPLAY METHOD

CROSS-REFERENCE TO RELATED APPLICATION

This application is a Section 371 National Stage Application of International Application No. PCT/CN2016/086390, filed on Jun. 20, 2016, entitled "LIQUID CRYSTAL PANEL, DISPLAY APPARATUS AND DISPLAY METHOD", which has not yet published and which claims priority to Chinese Application No. 201610125155.7, filed on Mar. 4, 2016, incorporated herein by reference in their entirety.

BACKGROUND OF THE DISCLOSURE

Field of the Disclosure

Embodiments of the present disclosure generally relate to the display field, and in particular, to a liquid crystal panel, a display apparatus and a display method.

Description of the Related Art

A liquid crystal display has replaced the conventional CRT display apparatus due to its advantages such as no radiation, low power consumption, low heat dissipation, low volume, accurate reproduction of images, sharp display of characters and the like. The liquid crystal panel is a crucial assembly of a liquid crystal display apparatus and may determine the brightness, contrast, color, visual angle to larger extent. The conventional liquid crystal panel includes a liquid crystal layer, and an upper polarizer and a lower polarizer having light transmission directions perpendicular to each other, and its display principle is given as following: the lower polarizer converts natural light into linearly polarized light; liquid crystal molecules in the liquid crystal layer convert the linearly polarized light into elliptically polarized light by changing its polarization states when being driven by a voltage; the upper polarizer analyzes the elliptically polarized light to achieve grayscale display. The conventional liquid crystal panel has disadvantages, i.e., optical efficiency loss may be greater than 50% for each transmission through a layer of polarizer and thus the optical transmission becomes low.

SUMMARY

Embodiments of the present application provide a liquid crystal panel, a display apparatus and a display method, that can reduce the number of polarizers, increase transmission of a display device and improve the optical efficiency of the display device.

In an aspect of the present disclosure, there is provided a liquid crystal panel having a plurality of sub-pixels and comprising: an upper substrate; a lower substrate; a liquid crystal layer sandwiched between the upper substrate and the lower substrate; a polarizer arranged on a side of the lower substrate facing away from the liquid crystal layer; a common electrode arranged on the upper substrate; and a plurality of pixel electrodes which are arranged on the lower substrate in a region corresponding to each of the sub-pixels and configured to be driven independently.

In an embodiment, the pixel electrodes are stripe-shaped electrodes.

In an embodiment, the pixel electrodes are made from a transparent and electrically conductive material.

In an embodiment, the sub-pixels comprise red, green and blue sub-pixels.

In an embodiment, the upper substrate is further provided with a first alignment film thereon, the first alignment film being arranged above the common electrode.

In an embodiment, the lower substrate is further provided with a second alignment film thereon, the second alignment film being arranged above the pixel electrodes.

In an embodiment, the plurality of pixel electrodes, which are arranged in the region corresponding to each of the sub-pixels, are distributed centrosymmetrically.

In an embodiment, liquid crystal molecules in the liquid crystal layer in a region corresponding to each of the sub-pixels are configured to form an equivalent lens when voltages are applied to the plurality of pixel electrodes arranged in the region corresponding to the sub-pixel.

In an embodiment, the equivalent lens comprises a convex lens, a concave lens or a prism.

In an embodiment, the liquid crystal molecules in the liquid crystal layer in a region corresponding to each of the sub-pixels are configured to form an equivalent convex lens or concave lens when a black image is displayed and to form an equivalent prism when a grayscale image other than the black image is displayed.

In an embodiment, the liquid crystal molecules in the liquid crystal layer each have a macroaxis parallel to a light transmission axis of the polarizer when being in an initial state.

In another aspect of the present disclosure, there is provided a display apparatus, comprising the liquid crystal panel as described in any one of the above embodiments. The display apparatus may further include a backlight source arranged to emit a collimation beam towards the polarizer.

In a further aspect of the present disclosure, there is provided a display method for use with the display apparatus as described above, the method comprising: when displaying a black image, applying pixel voltages which increase or decrease progressively to the pixel electrodes in a region where a same sub-pixel is located, such that an optical path length in the region where the sub-pixel is located is equivalent to that in a prism and a tilt of the equivalent prism causes an incident light to be incident onto the prism at an incident angle greater than a total reflection critical angle; and when displaying a grayscale image other than the black image, changing the voltages applied to the respective pixel electrodes in the region where each sub-pixel is located, such that an optical path length in the region where the sub-pixel is located is equivalent to that in a concave lens or a convex lens and the equivalent lens has a focal length corresponding to the grayscale of the image to be displayed by the sub-pixel, so as to control an angle of divergence of an emitting light beam to control brightness of the sub-pixel.

BRIEF DESCRIPTION OF THE DRAWINGS

In order to explain the solutions in embodiments of the present disclosure more explicitly, drawings for the embodiments will be introduced briefly below. Apparently, the following drawings only show some of embodiments of the present disclosure. The skilled person in the art may obtain other drawings from the attached drawings without any creative effort.

DETAILED DESCRIPTION OF PREFERRED EMBODIMENTS

Technical solutions of embodiments of the present disclosure will be explained clearly and entirely below with reference to the drawings. Apparently, the described embodiments are only some of embodiments of the present disclosure, instead of all of embodiments. All of other embodiments that can be envisaged by the skilled person in the art on the basis of the described embodiments of the present disclosure without any creative effort fall within the scope of the present disclosure.

Figure 1:
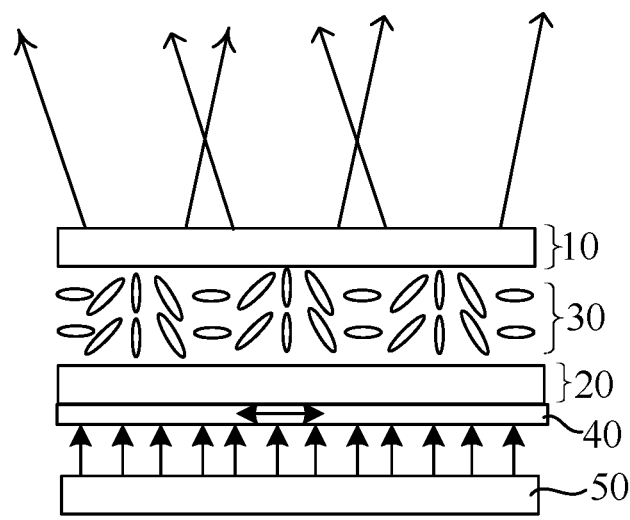
FIG. 1 is a schematic view showing a structure of a liquid crystal panel provided by an embodiment of the present disclosure.
Figure 2:
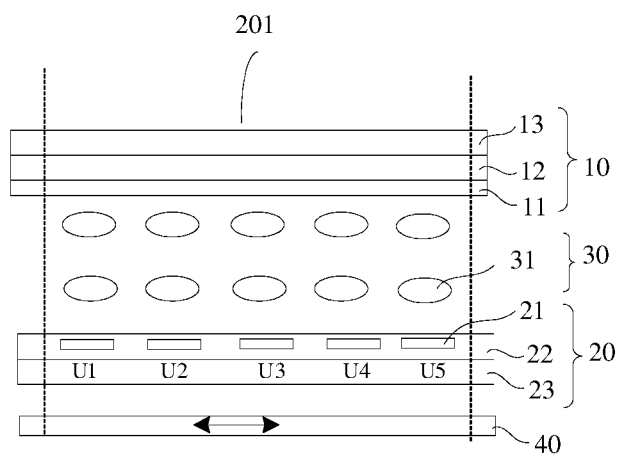
FIG. 2 is a schematic view showing an electrode arrangement and an initial liquid crystal state of a liquid crystal panel corresponding to a sub-pixel according to an embodiment of the present disclosure.

An embodiment of the present disclosure provides a liquid crystal panel. As illustrated in FIG. 1 and FIG. 2, the liquid crystal panel includes: an upper substrate 10; a lower substrate 20; a liquid crystal layer 30 sandwiched between the upper substrate and the lower substrate; and a polarizer 40 arranged on an outer side of the lower substrate 20 (i.e., a side of the lower substrate 20 facing away from the liquid crystal layer 30). A common electrode 12 is arranged on the upper substrate 10. A plurality of pixel electrodes are arranged on the lower substrate 20 in a region 201 corresponding to one sub-pixel and are configured to be driven independently.

The liquid crystal panel of the embodiment shown in FIG. 1 may achieve display if a backlight source 50 is attached thereto. Emitting light from the backlight source 50 is a collimated light beam shown in FIG. 1. The polarizer 40 has a light transmission axis parallel to macroaxes of liquid crystal molecules 31 in an initial state. For example, as illustrated in FIG. 1, when the polarized light having passed through the polarizer 40 passes through the liquid crystal layer 30, different polarization or deflection states of the liquid crystal molecules 31 in the liquid crystal layer correspond to different refractive indices. If the macroaxes of the liquid crystal molecules are parallel to the polarization direction of the emitting light, the refractive index of the liquid crystal layer to the light traveling therein is $n_e$; in contrast, if the macroaxes of the liquid crystal molecules are perpendicular to the polarization direction of the emitting light, the refractive index of the liquid crystal layer to the light traveling therein is $n_o$, where $n_e > n_o$. If the macroaxes of the liquid crystal molecules are neither parallel to nor perpendicular to the polarization direction of the emitting light, various refractive indices of the liquid crystal layer to the light traveling therein may be produced between $n_e$ and $n_o$.

The upper substrate 10, the lower substrate 20 and the liquid crystal layer 30 constitute a liquid crystal cell. FIG. 2 shows one optional electrode arrangement and one optional initial state of liquid crystal molecules. The common electrode 12 is arranged on the upper substrate 10. A plurality of pixel electrodes are arranged on the lower substrate 20 in a region 201 corresponding to one sub-pixel and are configured to be driven independently. For example, five pixel electrodes U1 to U5 that may be driven independently are arranged in the region 201 corresponding to one sub-pixel. The state of the liquid crystal molecules shown in FIG. 1 may be formed if a relative high voltage is applied to the electrode U3, relative low voltages are applied to the electrodes U2 and U4 and even lower voltage or no voltage is applied to the electrodes U1 and U5. In such state of liquid crystal molecules, the optical path length of the light passing through respective positions in a sub-pixel of the liquid crystal cell is equal to the optical path length of the light passing through a conventional concave lens with a certain focal length. In accordance with optical knowledge, in such arrangement, the liquid crystal structure of the liquid crystal cell is equivalent to an array of concave lenses, with one sub-pixel corresponding to one equivalent liquid crystal lens. By means of controllability of the focal length of the liquid crystal lens, the angle of divergence of the emitting light beam may be changed to control brightness (grayscale). Explanatorily, the larger the angle of divergence is, the higher the energy density of the light beam is and the larger the grayscale is; in contrast, the smaller the angle of divergence is, the lower the energy density of the light beam is and the smaller the grayscale is.

Figure 3:
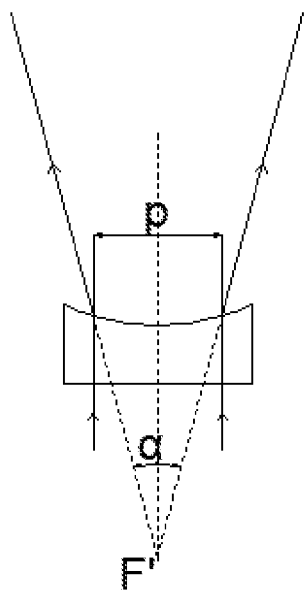
FIG. 3 is a schematic view showing a sub-pixel equivalent to a concave lens according to an embodiment of the present disclosure.
Figure 4:
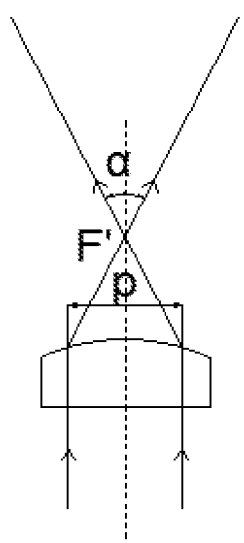
FIG. 4 is a schematic view showing a sub-pixel equivalent to a convex lens according to an embodiment of the present disclosure.

As an example, FIG. 3 and FIG. 4 show the states of the emitting light which is formed by a collimated light beam passing through a concave or convex lens. The dependency of angle of divergence α on the focal length of the lens f' is $$\tan\frac{\alpha}{2} = \frac{p/2}{f'},$$

where p is an optical diameter of the concave or convex lens. It can be seen that the focal length of the equivalent lens directly affects magnitude of the angle of divergence of the emitting light, thus, the angle of divergence of the emitting light may vary as the focal length changes, so as to control the grayscale. As shown, F' in the figures is a focal point of the concave or convex lens.

Figure 5:
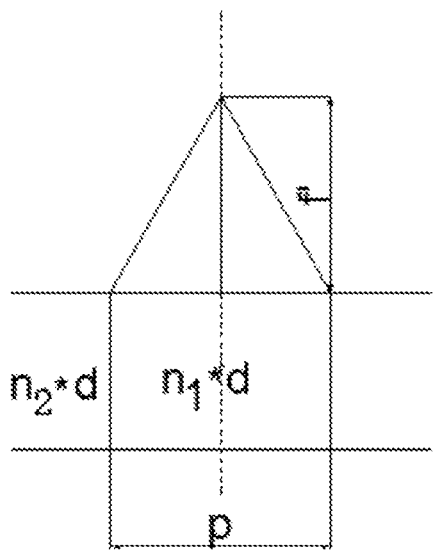
FIG. 5 is a schematic view showing a distribution of an optical path in a sub-pixel according to an embodiment of the present disclosure.

The relation between the focal length of the equivalent lens and the liquid crystal cell is given below. As shown in FIG. 5, a convex lens is taken as an example of the equivalent lens. From a rule of equal optical path length, the relation is given by the formula:

$$n_1 d + f' = n_2 d + \sqrt{f'^2 + \left(\frac{p}{2}\right)^2},$$

where $n_1$ is the refractive index of the liquid crystal at an edge of the corresponding lens, $n_2$ is the refractive index of the liquid crystal at an center of the corresponding lens, d is thickness of the portion of the liquid crystal layer in the liquid crystal cell corresponding to the equivalent lens. In the above formula, the part at left side of the equal sign represents the optical path length of the light beam travelling from the center of the liquid crystal lens to its focal point and the part at right side of the equal sign represents the optical path length of the light beam travelling from an either end of the liquid crystal lens to its focal point. Due to $[(n_1-n_2)*d]^2 \approx 0$, the above formula may be abbreviated into $$f' = \frac{p^2}{8(n_1 - n_2)d},$$

where $n_o \leq n_2 < n_1 \leq n_e$. For the concave lens, the conclusion of its formula is identical to that of convex lens. Thus, the details will be omitted herein.

Figure 6:
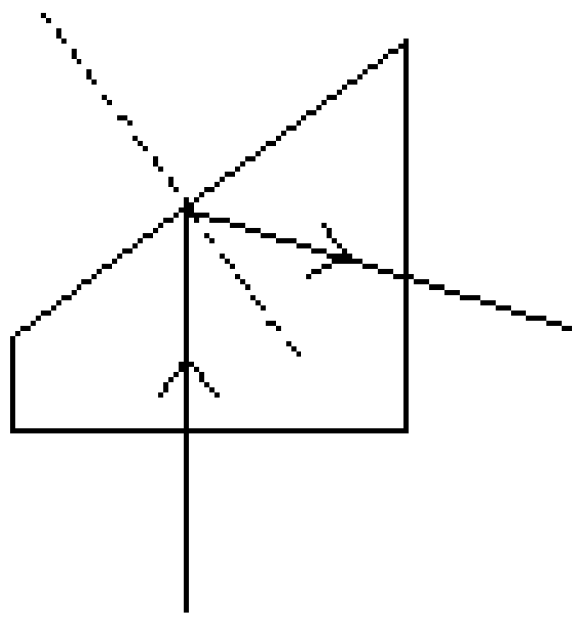
FIG. 6 is a schematic view showing a sub-pixel equivalent to a prism according to an embodiment of the present disclosure.

FIG. 6 shows principle of displays a black image by the display panel according to the present disclosure. Voltages applied to the electrodes U1 to U5 decrease gradually, such that the liquid crystal lens becomes equivalent to a prism shown in FIG. 6 and the incident angle of the light is greater than a total reflection critical angle. Finally, the light beam is reflected totally without transmission of the light beam. In such circumstance, the sub-pixel corresponding to the equivalent prism displays the black image.

Figure 7:
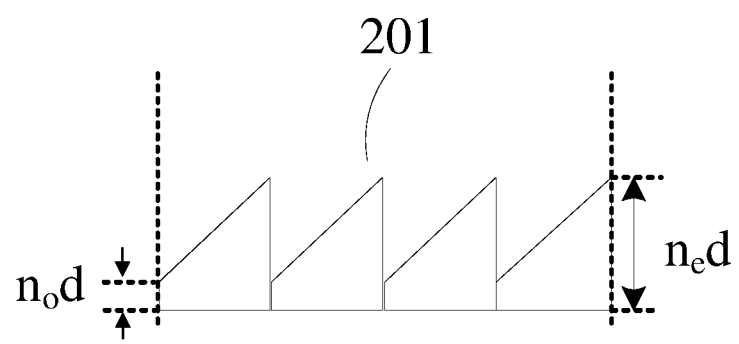
FIG. 7 is a schematic view showing a sub-pixel equivalent to a plurality of prisms according to an embodiment of the present disclosure.

Based on the above display principle, it is preferred that the refractive index of the liquid crystal layer in this embodiment varies in a large scope, i.e., the difference between $n_e$ and $n_o$ becomes relatively large to achieve a large number of grayscales such that the levels of colors have a high resolution. In this way, it is also easier to achieve full black display. With reference to the arrangement of the pixel electrodes shown in FIG. 2, if the liquid crystal molecules in a region 210 corresponding to one sub-pixel is equal to a small prism when the black image is displayed, the left edge and the right edge of the equivalent lens may have a maximum optical path length of $(n_e-n_o)d$. The larger the difference between $n_e$ and $n_o$ is, the tilter the inclined surface of the equivalent prism is. In same incidence conditions, the larger the incident angle is, more easily the total reflection condition will be met (it is easy to achieve full black display). If the difference between $n_e$ and $n_o$ is not enough large to satisfy the total reflection conditions, the liquid crystal molecules in the region 201 corresponding to one sub-pixel may be equal to a plurality of small prisms, as shown in FIG. 7. Similarly, when the grayscale display is made, the liquid crystal molecules in the region 201 corresponding to one sub-pixel may also be equal to a plurality of small lenses.

In embodiments of the present disclosure, shapes of the pixel electrodes and arrangement of the plurality of pixel electrodes in the region corresponding to a same sub-pixel are not limited, as long as these pixel electrodes may be driven independently and be applied with different voltages. As an example, the above pixel electrodes are stripe-shaped electrodes. In consideration of the display effects, the plurality of pixel electrodes arranged in the regions corresponding to one sub-pixel are typically distributed centrosymmetrically.

It should be noted that the electrode arrangement and the initial state of the liquid crystal molecules shown in FIG. 2 are only one of optional solutions. The present disclosure is not limited to this. In the initial state of the liquid crystal molecules shown, the macroaxes of the liquid crystal molecules are parallel to the light transmission axis of the polarizer. For example, the direction of the light transmission axis of the polarizer 40 may be perpendicular to the page and the direction of macroaxes of the liquid crystal molecules in the initial state determined by alignment films (11, 22 shown in FIG. 2) is parallel to the direction of the light transmission axis of the polarizer 40. The directions of the above axes are not limited in the embodiments herein and the macroaxes of the liquid crystal molecules in the initial state may have arbitrary directions as long as they are parallel to the light transmission axis of the polarizer.

Figure 8:
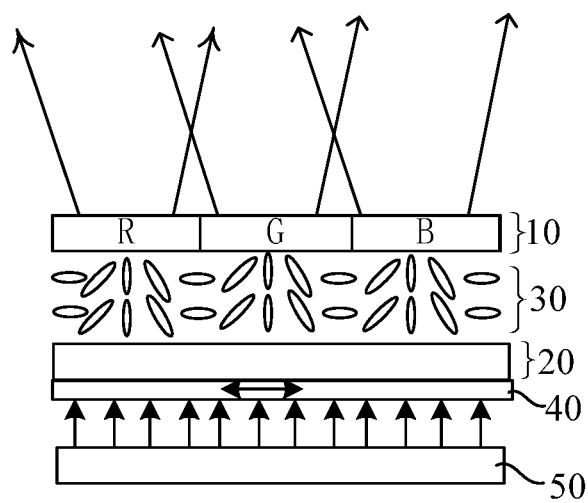
FIG. 8 is a schematic view showing operations of a display panel provided by an embodiment of the present disclosure.

The above pixel electrodes are made of a transparent and electrically conductive material. The above sub-pixel may typically be red, green or blue sub-pixel. Certainly, any sub-pixels other than the red, green and blue sub-pixels are also available for other color solutions. As shown in FIG. 8, the above sub-pixel is any one of the red, green and blue sub-pixels. The display panel includes a plurality of pixels. Each of the pixels includes three sub-pixels, including red, green, blue sub-pixels. A plurality of pixel electrodes that may be driven independently are arranged in the region corresponding to each of the sub-pixels. The focal length of the equivalent lens corresponding to the liquid crystal molecules in the sub-pixel may be adjusted by controlling the magnitude of voltages applied onto the respective pixel electrodes in the region corresponding to the sub-pixel, so as to control the divergence of the light beam emitted from the sub-pixel to achieve display of various grayscale images. In this way, the black image or other grayscale images may be displayed without analyzing the light beam emitted from the sub-pixel.

The upper substrate 10 is further provided with a first alignment film 11 thereon, the first alignment film 11 being arranged on the common electrode 12, for example arranged on the side of the common electrode 12 facing towards the liquid crystal layer. The lower substrate 20 is provided with a second alignment film 22 thereon, the second alignment film 22 being arranged over the pixel electrodes 21, to fill a gap among the pixel electrodes 21. The first alignment film 11 and the second alignment film 22 provide consistent predetermined polarization states for the liquid crystal molecules (for example, the direction of the macroaxes of the liquid crystal molecules in the initial states).

The display panel in the embodiments does not need to be provided with any polarizer or other polarization analyzer on the side of the upper substrate for cooperating with the polarizer provided on the lower substrate, thus, one layer of polarizer may be omitted to increase the transmissivity of the display device and finally may achieve the display with high optical efficiency. It saves one layer of polarizer in comparison with the conventional LCD display, so as to increase the transmissivity of the display device and to enhance the optical efficiency.

An embodiment of the present disclosure also provides a display apparatus including the liquid crystal panel as described in any one of the above embodiments. The display apparatus may have high optical efficiency and save electrical energy due to removal of one layer of polarizer. The display apparatus may include: any products or parts having display function, such as an electronic paper, a mobile phone, a tablet computer, a TV set, a display, a notebook computer, a digital photo frame, a navigator and the like.

An embodiment of the present disclosure also provides a display method adapted for the display apparatus as described above. The method includes: when displaying a black image, applying a pixel voltage which increases or decreases progressively to all of pixel electrodes in a region where a same sub-pixel is located, such that an optical path length in the region where the sub-pixel is located is equivalent to that in a prism and tilt of the equivalent prism causes an incident light to be incident onto the prism at an incident angle greater than a total reflection critical angle; and when displaying a grayscale image other than the black image, changing the voltage applied to the respective pixel electrodes in the region where each sub-pixel is located, such that an optical path length in the region where the sub-pixel is located is equivalent to that in a concave lens or a convex lens and the equivalent lens has a focal length corresponding to the grayscale of the image to be displayed by the sub-pixel, so as to control an angle of divergence of an emitting light beam to control brightness of the sub-pixel. Thus, according to the embodiments of the present disclosure, it does not need to provide any polarizer on the side of the upper substrate for cooperating with the polarizer provided on the lower substrate, thus, one layer of polarizer may be omitted to increase the transmissivity of the display device and finally may achieve the display with high optical efficiency. It saves one layer of polarizer in comparison with the conventional LCD display, so as to increase the transmissivity of the display device and to enhance the optical efficiency.

For the sake of clarity, in the present disclosure, phrases such as "first", "second" and the like are used to distinguish similar terms. The phrases "first" and "second" are not intended to limit the number of the terms in the present disclosure, but only explain preferable examples. All of apparent variants or spread that the skilled person in the art can envisage from the disclosure of the present disclosure belongs to the scope of the present disclosure.

In the liquid crystal panel, the display apparatus and the display method provided by embodiments of the present disclosure, the common electrode is arranged on the upper substrate, a plurality of pixel electrodes are arranged on the lower substrate in a region corresponding to each sub-pixel and are configured to be driven independently, and a liquid crystal layer is provided between the upper substrate and the lower substrate. When various voltages are applied onto the respective pixel electrodes of each sub-pixel, the liquid crystal molecules located above the respective pixel electrodes have different degrees of deflection and different optical path lengths. The liquid crystal molecules in the region corresponding to the sub-pixel may be equal to a lens (equivalent to a lens in optical path length) by adjusting voltages on the respective pixel electrodes of the sub-pixel. The divergence of the emitting light beam may be controlled by changing the focal length of the equivalent lens, thereby controlling the brightness of the sub-pixel corresponding to grayscale in display. Thus, with the liquid crystal panel, the display apparatus and the display method of the present disclosure, there is no need to provide any polarizer or other analyzer onto the side of the upper substrate for cooperating with the polarizer provided on the lower substrate. Therefore, it may reduce the number of polarizers, increase transmissivity of the display device and improve the optical efficiency of the display device.

The above described embodiments are only exemplary embodiments of the present disclosure, but scopes of the present disclosure are not limited to those. Any modification or alternative to the above embodiments that can be obtained apparently by the skilled person in the art from the disclosure in the present application should fall within the protection scope of the present disclosure. Therefore, the protection scope of the present disclosure should be defined by the appended claims.

What is claimed is:

1. A display method for use with a display apparatus, the display apparatus comprising a liquid crystal panel having a plurality of sub-pixels and comprising: an upper substrate; a lower substrate; a liquid crystal layer sandwiched between the upper substrate and the lower substrate; a polarizer arranged on a side of the lower substrate facing away from the liquid crystal layer; a common electrode arranged on the upper substrate; and a plurality of pixel electrodes, which are arranged on the lower substrate in a region corresponding to each of the sub-pixels and are configured to be driven independently, the method comprising:

when displaying a black image, applying pixel voltages which increase or decrease progressively to the pixel electrodes in a region where a same sub-pixel is located, such that an optical path length in the region where the sub-pixel is located is equivalent to that in a prism and a tilt of the equivalent prism causes an incident light to be incident onto the prism at an incident angle greater than a total reflection critical angle; and when displaying a grayscale image other than the black image, changing the voltages applied to the respective pixel electrodes in the region where each sub-pixel is located, such that an optical path length in the region where the sub-pixel is located is equivalent to that in a concave lens or a convex lens and the equivalent lens has a focal length corresponding to the grayscale of the image to be displayed by the sub-pixel, so as to control an angle of divergence of an emitting light beam to control brightness of the sub-pixel.

2. The display method according to claim 1, wherein the images are displayed without providing a polarization analyzer for the light beam emitted from the sub-pixel.

* * * * *